Figure 1:
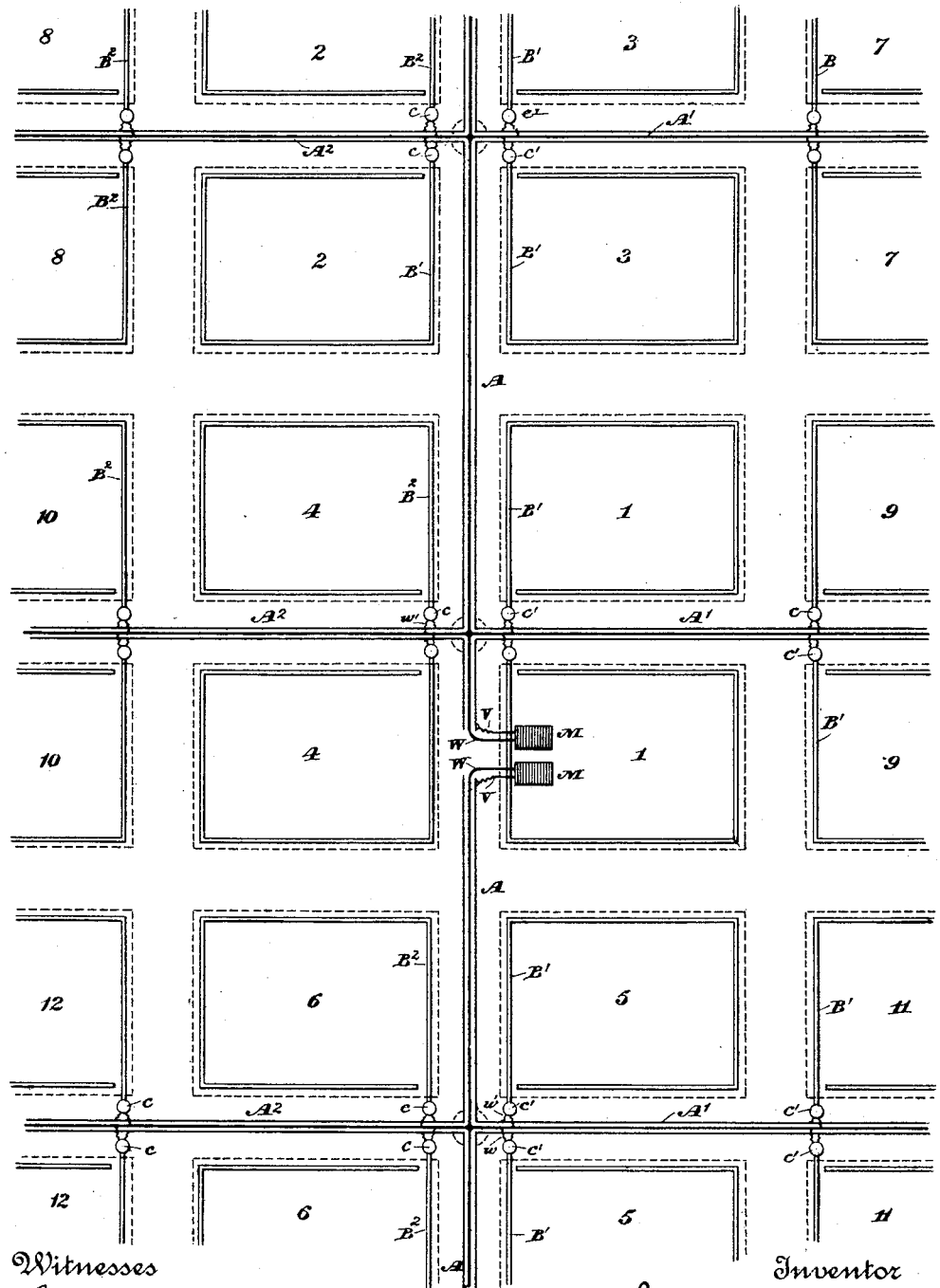

(No Model.)　　　　　　　　　　　　　　　　　6 Sheets—Sheet 1.
C. J. KINTNER.
SYSTEM OF ELECTRICAL CONDUCTORS.

No. 473,932.　　　　　　　　　　Patented May 3, 1892.

Witnesses　　　　　　　　　　　　　　　　　Inventor
Geo. W. Dreck　　　　　　　　　　　　Charles J. Kintner
C. E. Ashley (No Model.) 6 Sheets—Sheet 2.
C. J. KINTNER.
SYSTEM OF ELECTRICAL CONDUCTORS.
No. 473,932. Patented May 3, 1892.
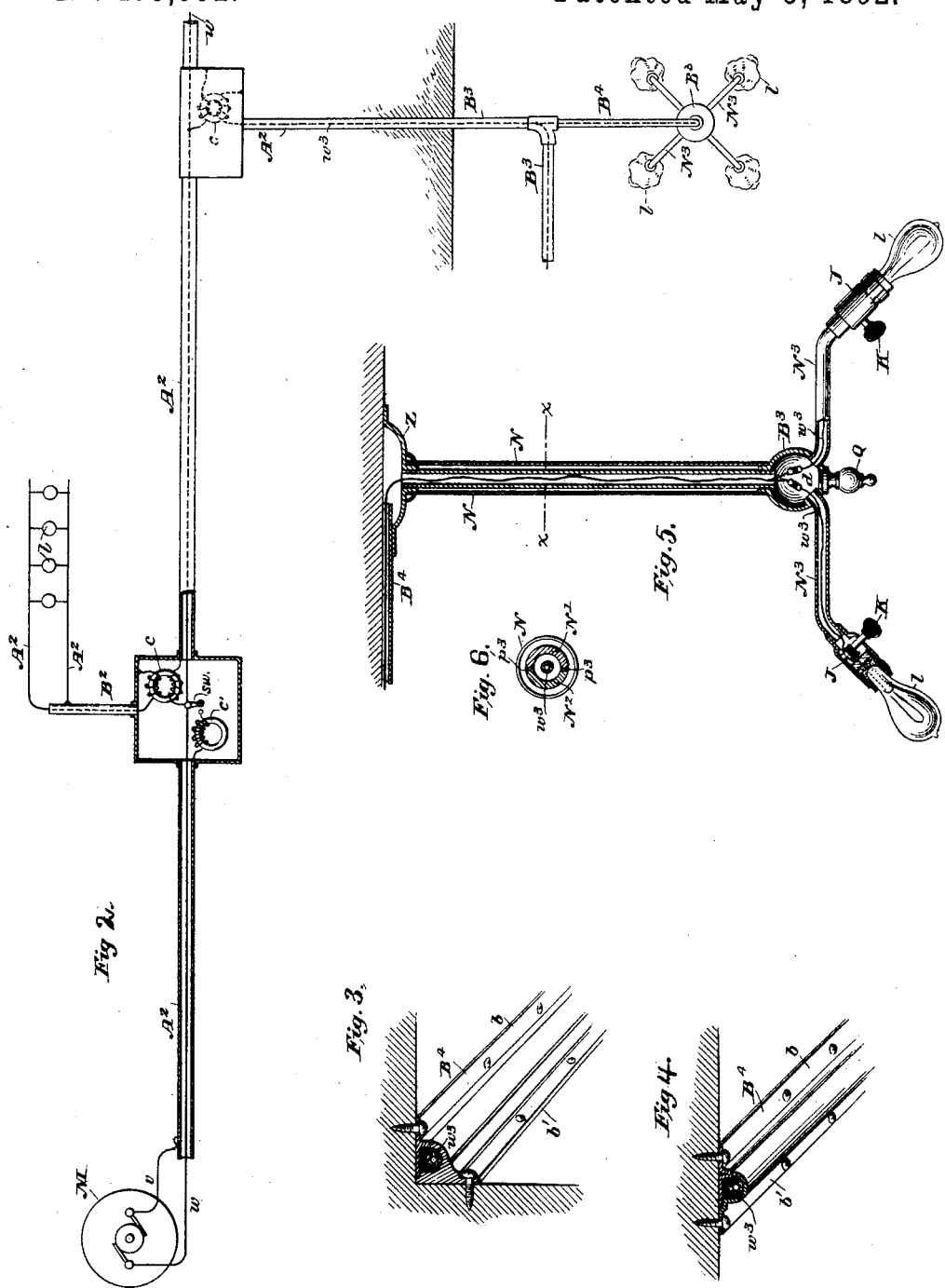
Witnesses
Geo. W. Breck.
C. E. Ashley
Inventor
Charles J. Kintner (No Model.)  6 Sheets—Sheet 3.
C. J. KINTNER.
SYSTEM OF ELECTRICAL CONDUCTORS.

No. 473,932. Patented May 3, 1892.

Witnesses
Geo. W. Breck.
C. E. Ashley

Inventor
Charles J. Kintner

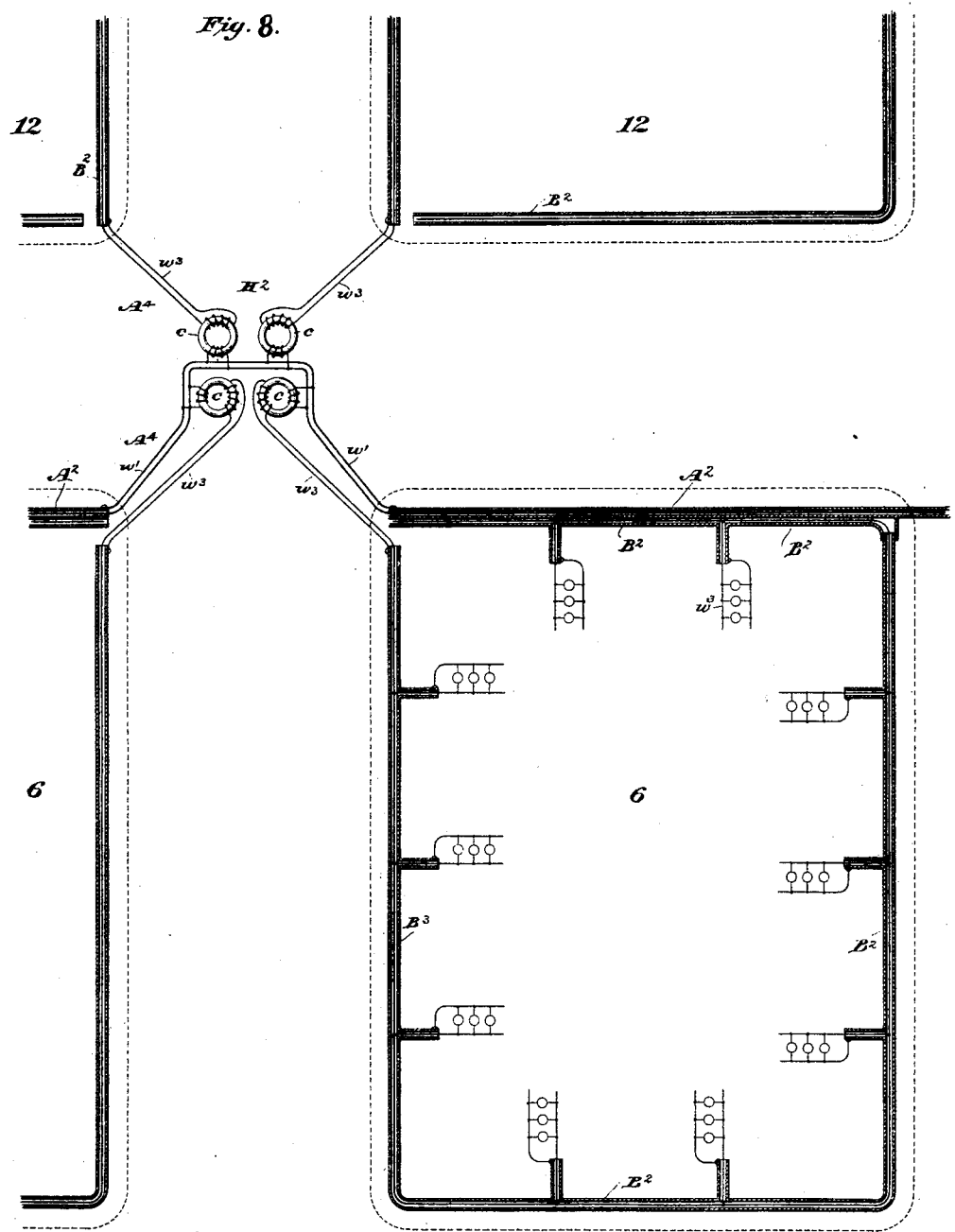

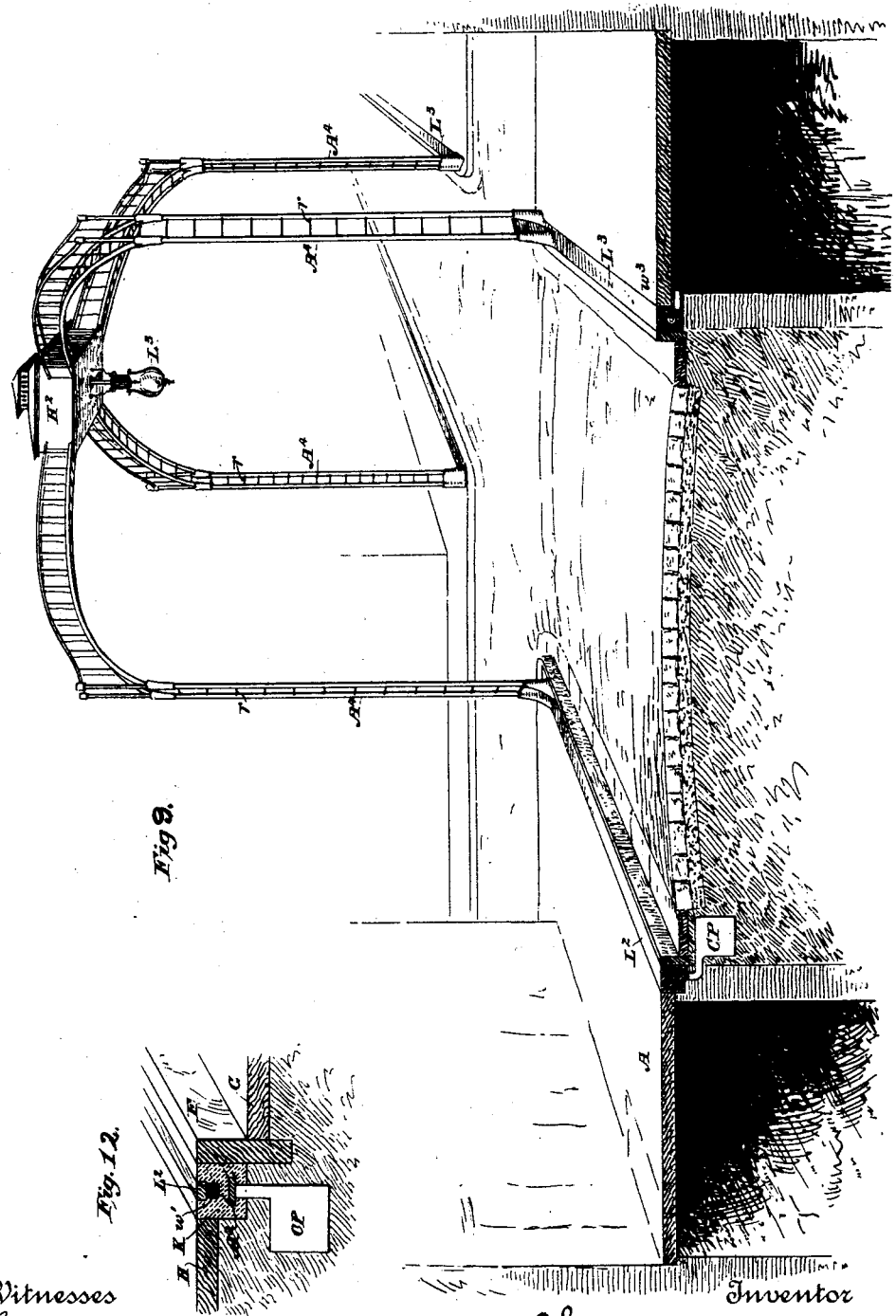

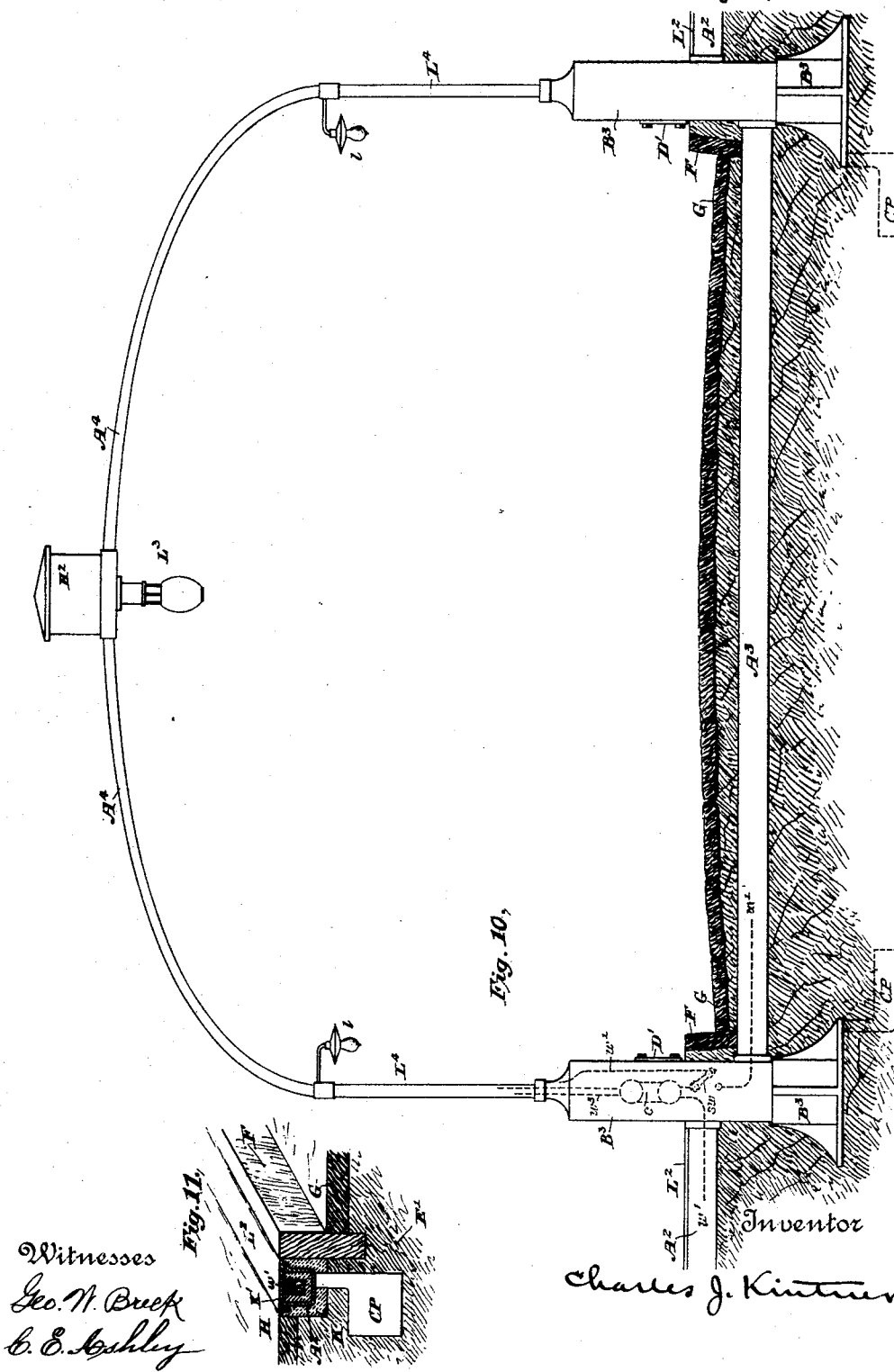

UNITED STATES PATENT OFFICE.

CHARLES J. KINTNER, OF NEW YORK, N. Y.

SYSTEM OF ELECTRICAL CONDUCTORS.

SPECIFICATION forming part of Letters Patent No. 473,932, dated May 3, 1892.

Application filed April 18, 1890. Renewed September 30, 1891. Serial No. 407,222. (No model.)

*To all whom it may concern:*

Be it known that I, CHARLES J. KINTNER, a citizen of the United States, residing at New York, in the county and State of New York, have made a new and useful invention in systems of electrical conductors for the distribution of electricity in the transmission of power for electric lighting, electric heating, and analogous purposes, of which the following is a specification.

The present invention is directed particularly to an improved system of electrical conductors for use in connection with the distribution of large-quantity and high-potential currents—such, for instance, as is required in electric lighting, the distribution of power, electric heating, &c.

The objects of my invention are, first, to make systems of electrical conductors secure against accidents resulting from bad insulation, and to avoid as far as possible the evil effects of dampness or moisture in such systems; second, to protect systems of conductors of this nature from damage due to lightning; third, to cheapen the cost of such systems by utilizing a minimum amount of metallic conductors; fourth, to avoid, so far as possible, the evil effects of induction from currents of this nature upon telephonic, telegraphic, or other conductors located near by; fifth, to render systems of this nature more secure against accidents due to fire occasioned by short-circuiting the wires in buildings where the currents are utilized; sixth, to cheapen and simplify the construction and arrangement of indoor conductors and to so locate and arrange them that they may be easily put in place, taken down, or repaired, and at a minimum expense, with a minimum amount of annoyance or disturbance to the user; seventh, to adapt the outdoor system of conductors for use with any system of electrical generation and service. I accomplish these several objects by the arrangement of circuits, details of construction and apparatus hereinafter described, but particularly pointed out in the claims which follow this specification.

My invention will be fully understood by referring to the accompanying drawings, in connection with the following specification, which is a full, clear, and exact description of all of the features which constitute the invention I now seek to patent.

In all of the drawings like letters of reference and figures represent like parts wherever used.

Figure 4:
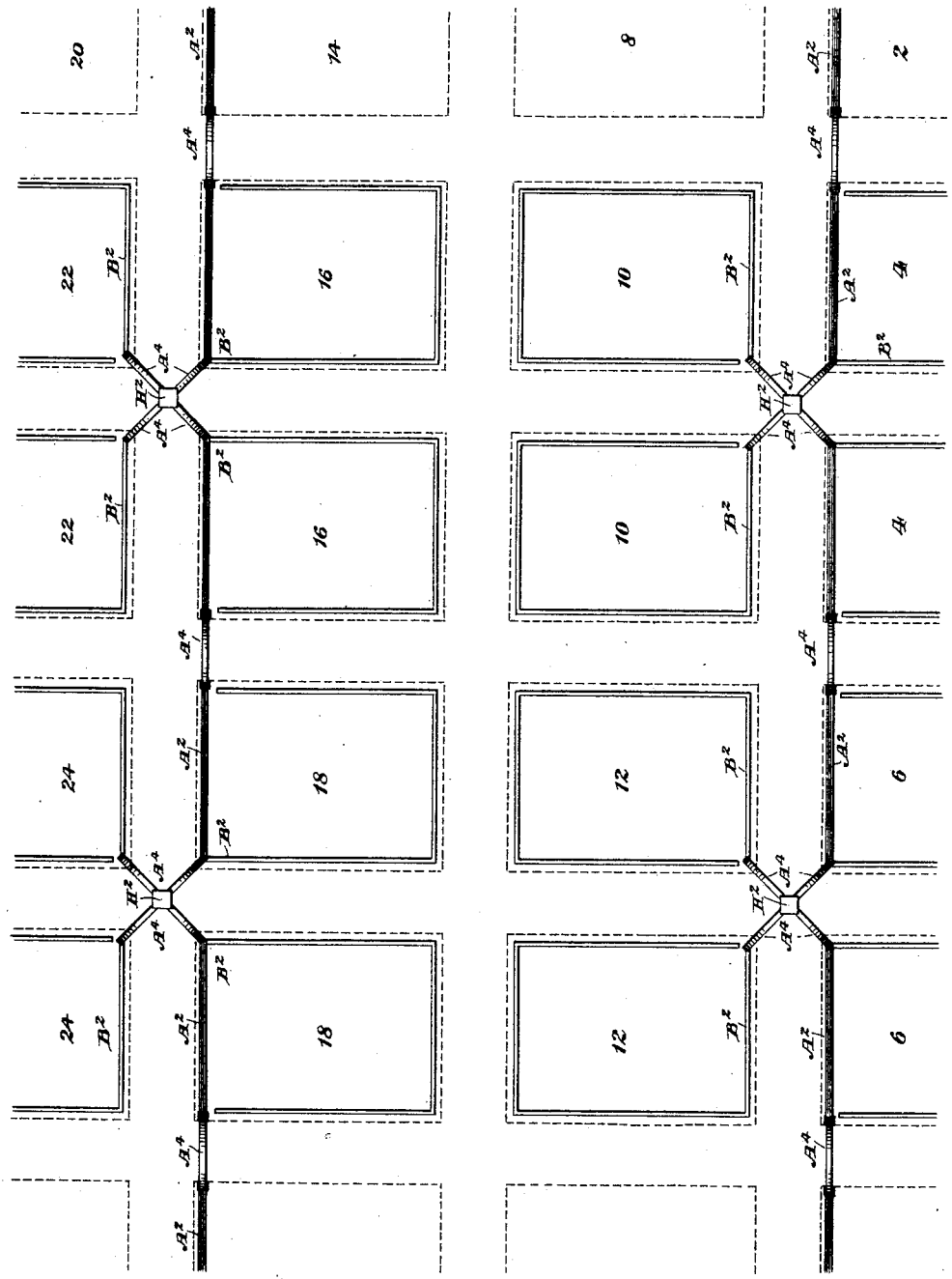

Figure 1 represents a diagrammatic or plan view of my improved system of electrical distribution. Fig. 2 is a diagrammatic view disclosing the entire system of circuits, from the generator to a set of lamps inside of the building. Fig. 3 is an isometric view showing my improved form of interior house-wiring. Fig. 4 is a similar view showing a modified form. Fig. 5 is a sectional view of my improved form of electrolier, as shown in connection with my improved system of interior house-wiring. Fig. 6 is a sectional view of Fig. 5, taken on line $x\,x$. Fig. 7 is a diagrammatic or plan view illustrating my improved system of distribution to outlying blocks or squares of a city in sets of four blocks each from each main or leader. Fig. 8 is an enlarged plan view showing the circuit connections in this improved four-block system of distribution. Fig. 9 is a perspective view showing my improved system of distribution as used in a city. Fig. 10 illustrates, in elevational view, a single-arch system of crossing the streets with my improved system of conductors, together with a subway conduit, which may take the place of the arch. Fig. 11 represents an isometric view of my improved surface conduit located at the edge of the sidewalk, provided with metallic plates connecting it electrically with the earth. Fig. 12 represents a similar view of a modified form of surface conduit.

Prior to my invention it was the custom, as a rule, in systems of electrical conductors to carry the wires or conductors either upon overhead supports—such as poles with cross-arms—or to bury them in conduits located beneath the surface of the street, man-holes being located at specified distances for manipulating said wires in the conduits. The very material increase in the use of electricity in systems of electric lighting and the transmission of power has to a large extent increased the dangers due to service of this nature, and many arrangements of circuits have been devised for the protection of life and property. In systems of distribution wherein subways are employed great difficulty is found in overcoming the evil effects of moisture in the conduits, and the deleterious effects which result to both the conduit and the cables therein constitute the chief objection to subways. No system, so far as I am aware, has yet been devised whereby electrical currents of high potential can be distributed to users or consumers which shall be safe against accidents due to fire, lightning, and contacting therewith, and which shall at the same time be absolutely permanent in its structure. It is with a view of accomplishing these results that I have devised the herein-described safety system of distribution.

Referring now to the drawings in detail, in Fig. 1 M M represent a pair of dynamo-machines, of any preferred form, here shown, however, as alternate-current machines, one pole of each machine being connected by a wire V with a metallic or conducting conduit A, running the entire length of the adjacent street, the block 1, in which the generators are situated, being in or about the geographical center of the city or town to be supplied with electrical currents. The other poles of these generators are connected to wires W, which are located inside the metallic conduits in substantially the manner shown and described in a prior patent, granted to me on the 22d day of April, 1890, No. 426,127. It will be observed that the main conduit A has connected to it at intervals of alternate blocks branch conduits A' A' A' and $A^2$ $A^2$ $A^2$, running to the right and left through the alternate streets, and that the interior concentric wires W branch at the junction of these streets, passing in each direction through the conduits A' $A^2$. $c$ $c$ and $c'$ $c'$ are converters, the primaries of which are connected by wires $w'$ with the conduits A' $A^2$ and their interior wires W. Around the blocks 1 2 3 4 5 6, &c., are sub-conduits B' $B^2$, of concentric form, in which are located the supply-wires for supplying the users in the various blocks (more clearly shown in Fig. 8) and connected by wires $w^3$ $w^3$ to the secondary circuits of the converters $c$. By this arrangement of circuits it will be noted that I carry the currents from the generators M M in each direction through a given central street and then take off branch mains through alternate streets at right angles in each direction and supply the blocks on either side of these mains, thereby doing away with a single main for each street, as is now the custom in distribution systems.

Referring now to Fig. 7, I will describe my method of four-block current distribution from centers located at alternate blocks. The branch main $A^2$ passes up the street and crosses the first street by the archway $A^4$ or the subway conduit $A^3$ of metal, (see Figs. 7, 9, and 10,) and is electrically joined to the base of the four-way arch $A^4$, the entire arch system being joined electrically to the sub or distribution branches $B^2$, as seen in blocks 18 and 24, or 16 and 22, or 6 and 12, or 4 and 10, the entire conduit system being in turn electrically joined together through the archways $A^4$, main conduits $A^2$, and subway conduits $B^2$, and they in turn being connected back through the primary conduit A to the generators M M at the generating-station. In other words, the entire system of conduits A A' $A^2$ and B' $B^2$ are in metallic contact with each other and with the earth through the agency of large copper or other equivalent electrical conducting-plates C P, electrically secured to the conduit, as shown in Figs. 10, 11, and 12, so that the entire system has substantially the same potential as the earth. The conduit $A^2$ is preferably of double form, as shown in Fig. 8, one portion being used for the primary circuit and the other for the secondary circuit where converters are used, although said double-way conduit may be used in direct-current systems, the main or outer portion being used for carrying arc-light or other currents and the secondary portion for carrying incandescent or low-tension currents. It will be noted that the internal or concentric conductors $w'$ are carried up through tubular metallic archways $A^4$ to distributing or switch houses $H^2$, located at the top of the archway, containing converters or other switch connections of any preferred form. They then pass down through that branch of the four-way arch which connects it with the main again, and on to the next direct arch $A^4$ and to the succeeding four-way and direct arches in alternate order, the secondary circuits, when converters are used, being branched through the remaining legs of the arch to the blocks 6 6 12 12, as clearly shown in Fig. 8. Beneath the switch-house $H^2$, I show an arc lamp $L^3$, and at various points on the archway incandescent lamps $l$, which may be used jointly with $L^3$ or independently, as desired, to light streets. Additional arc lamps may be used when it is desired to take the archways $A^4$ down and conduct the current through the sub-conduit $A^3$. In this event the additional lamps would appear on the top of the posts $L^4$, supported by the base-pieces $B^3$, said base-pieces having sufficient interior room to sustain the converters or switch apparatus necessary to make the required connections for both the lamps $L^3$ and the house-lamps in the sub-circuits. (See Fig. 10.) D' D' represent doors in the metallic bases $B^3$ for affording access to the conductors and circuit connections. With this arrangement of circuit connections in the bases $B^3$ or in the switch-houses $H^2$, I locate all of my circuit connections above ground, where they are free from moisture and practically in the open air—a feature which will at once commend itself to those skilled in the art. The archways $A^4$ are preferably made of iron tubing, as light and durable as possible, connected together by stays $r$, which act as rungs to enable an attendant to reach the switch-houses $H^2$.

Referring now to Figs. 11 and 12, I will describe my preferred form of conduit. I remove the ordinary curb in the street and the gutter-stones and dig a trench of sufficient width and depth to admit of replacing a curbing F and gutter G just at the edge of the trench. I then locate an iron or other conducting-conduit $A^2$ of U shape within said trench at a sufficient height above the bottom thereof to admit of the presence of a body of cement beneath it. I then fill the entire space of the gutter around said conduit $A^2$ with cement K, the conduit $A^2$ having been electrically connected at various points with moist earth by a copper or equivalent plate CP, and drainage-holes having been provided through the conduit, preferably at or near the point of juncture with plates CP for conducting off such moisture as may accidentally accumulate in the conduit. I then join the conduit $A^2$ electrically to the base-pieces $B^3$ and the archways $A^4$ and subways $A^3$ at the street and alley crossings, the subway $A^3$ being generally sufficient for the alley-way crossings, which subway may either be in the nature of a metallic pipe having an insulating-tube in its interior or a trough, like $A^2$, having removable covers beneath the alley-way or streetway. After the cement has become set about the conduit $A^2$, the top of which is flush with the pavement H and curb F, I place a wooden trough or successive series of wooden timbers in the body of the conduit, held up from the bottom thereof by supports at their ends, and encompass the same by a second interior coating of cement K' and allow it to harden. After it has thus become hardened or set I remove the timbers and drill the necessary drainage-holes through the cement near the plates CP, as before described. The conduit is now complete and ready for the cover $L^2$, which may be of metal or any preferred material. If desired, this conduit may be somewhat lower than the sidewalk H and covered with ordinary sidewalk-stone. After the conduit is completed lead-covered cables $w'$—such as are now used in the subways—are unreeled upon the sidewalk and rolled into place into the cement-groove, said cable constituting one part of the circuit and the conduit $A^2$ the other, having a potential substantially that of the earth. At the archways the cables are of course cut and their ends connected through the necessary switch connections to the converters or to the consumers' circuits, in accordance with either the direct or the converter system of distribution.

In Fig. 12 I show a modified form of conduit in which I embed simply a copper strip $A^2$ or other conducting material in the body of the cement K in the manner I have already described and connect said strip with the earth by copper or equivalent plates CP, as before, said strip being connected directly to the bases $B^3$ of the archways at the street and alley crossings, and locate the lead-covered cable in the groove in the body of the cement conduit K, said groove being filled above the cable by long wooden strips or coverings $L^2$, easily removed. It will be understood, of course, that the secondary conduits $B^2$, which surround the blocks, are in every sense similar in their construction to those I have just described and that the interior concentric conductors are preferably lead-covered cables, connected as shown in Fig. 8 if converters are used and directly in a manner well understood by electricians if a direct-current system is used, and that the branches $B^3$ from this secondary-conduit system are electrically connected thereto, as shown in Figs. 2 and 8, and the converters may be located in the cellar-ways in metallic boxes electrically connected with these secondary conduits, if preferred, primary converters being located in the switch-houses $H^2$, such matters being obvious. It will be understood, therefore, that the entire system of concentric conductors, extending from the lamps $l$, Fig. 5, through the electrolier and the metallic concentric conducting-strip $B^4$ and the metallic branch $B^3$, is electrically in contact with the exterior system of conduits to earth. At all points where the conductors pass beneath the sidewalk A into the cellar-ways or into the places of distribution I make the outer concentric conductor preferably of two parts, as shown in Figs. 3, 4, and 5. These parts are in the nature of a conducting-tube of metal (represented by the letters $b$ and $b'$) and held against the wall or ceiling or in a corner, acting as a molding, by screws or in any preferred manner. The portion $b$ may be readily removed when it is desired to get at the interior insulated conductor $w^3$, and said conductor may at any time be quickly and easily taken out. It will be seen on examination of Figs. 3 and 4 that this two-part metallic tube acts both to sustain the insulated wire $w^3$ and as a return-conductor for the current from the lamps. The electrolier, as shown in Fig. 5, is also made of detachable parts $N'$ $N^2$, of metal, doweled together by dowel-pins $p^3$, an insulated wire $w^3$ having first been placed in position between said parts $N'$ $N^2$, after which they are jointly screwed into the support or base Z, which is sufficiently large to maintain the necessary fusible cut-outs of the usual type. The part $N'$ $N^2$, inclosing the wire $w^3$ having been screwed in position in the part Z, the ornamental cover N is slipped over this two-part tube $N'$ $N^2$ and the screw-threaded bulb $B^3$ screwed in place about the lower end of the two-part tube $N'$ $N^2$, the ornamental shield N resting on said bulb. The wire $w^3$ and its necessary branches are then passed through screw-threaded holes on the lower side of the bulb $B^3$ and secured in position in the arms $N^3$ of the electrolier, after which said arms are screwed in place and the lamps $l$ fixed to their metallic sockets J. The ornament Q is then screwed into position in the base of the bulb $B^3$, so as to secure the arms $N^3$ firmly in place. It will be noted that I make the opening in the base of the bulb $B^3$ sufficiently large to admit of manipulating the wires and fusible cut-outs $d$, located therein before the ornament Q is screwed in place. The switches K have the usual insulating-handles, and the bodies thereof are of metal and electrically connected with the metallic arms $N^3$, and through them, through the two-part tube $N'N^2$, to the metallic two-part tube $B^4$, and ultimately to the outside metallic-conduit system through the tube $B^3$, so that it will be seen that there is no possibility of receiving a shock from either of the switches K in the event of any short circuit in the system, the entire system being electrically connected with the earth. It will also be readily understood that there is no possibility of any danger from lightning either to the consumers or the translating and generating devices, inasmuch as the entire system is concentric from the generator to the consumer, and a short circuit at one point within the system can only result in the burning out of the fusible cut-out located nearest to it. It will also be readily understood by those skilled in the art that because of the fact that one system of conductors is inclosed in the other, and that the latter is given the same potential as the earth, there can be no radiating or inductive effects from the interior system. It is also obvious that there can be no evil results from contact of conductors or wires from other systems of distribution, such as telephonic and telegraphic.

I do not limit myself to the specific constructions herein shown and described, as it is obvious that many modified forms of apparatus might be devised for such purpose and still come within the scope of my claims. To illustrate my meaning, I may entirely do away with the outer or inclosing conduit $A^2$ or its equivalent conducting-strip (shown in Fig. 12) and inclose the lead-covered or insulated mains $w'$ in a cement or other insulating conduit, as before, and provide earth connections at the ends of the blocks or at the alley-ways for the conducting-bases $B^3$ of the archways, as shown at CP, Fig. 10. By so doing I provide a safe and sure earth-contact for the sustaining archways at all points where the incased conductors are liable to be approached by the public, and by this means I give to the system the same potential as the earth and with perfect safety. By this arrangement I have in effect only one set of all-wire conductors. Neither do I limit myself to the location of the protected cables in the sidewalk, as they may be supported above the earth, if desired, in any preferred manner and at any preferred location, it being understood that when so located above the street or sidewalk surface there must be a permanent outer metallic casing or surrounding conductor $A^2$ connected at intervals with the earth by earth plates or conductors CP. Nor do I limit myself to the specific construction of divided conduit-tubes for house or indoor use, as herein shown. I may provide tubes of metal or other material divided longitudinally, and, if preferred, doweled together by pins, as is the inner electrolier-tube, (see Fig. 5,) and such tubes may be held together end to end by screw-collars, after the manner of gas-pipes sustained by eyes or loops, or any preferred arrangement of sustaining devices. The wire-protecting tubing $B^3$ may also be located inside the walls of a building in any preferred manner, my invention being directed, broadly, in this particular to a protecting tubing or casing made of conducting material and of two parts, one of which is detachable to facilitate handling of the inclosed wire or wires.

Having thus described my invention, what I claim, and desire to secure by Letters Patent of the United States, is—

1. A system of electrical conductors, consisting of an insulated conducting main or lead connected at one end to one pole of a dynamo-electric machine or equivalent source of electrical energy and located in an insulating-conduit situated substantially above ground and provided with removable covers, in combination with a series of insulated branch conductors connected to the aforesaid main or lead, provided with concentric return-conductors connected to the earth, the other pole of the dynamo being connected directly to earth and the conducting main or lead being removable from the conduit, substantially as described.

2. An insulated electrical main located in an insulating-conduit situated substantially above ground and connected directly to one pole of a dynamo-machine or equivalent source of electrical energy, in combination with a branch circuit consisting of a pair of concentric conductors, the inner conductor being removable and the outer conductor being connected directly to the earth, and one or more translating devices included in the branch circuit, the other pole of the dynamo being connected directly to earth, substantially as described.

3. An insulated electrical main removably inclosed in an insulating-conduit located substantially above ground, said main being connected directly to one pole of a dynamo-machine or equivalent source of electrical energy, in combination with a branch circuit consisting of a pair of concentric conductors, the outer conductor being connected directly to the earth, and one or more translating devices included in the branch circuit, the other pole of the dynamo being connected directly to earth, substantially as described.

4. In a system of electrical distribution, the tubular archways of conducting material electrically connected to earth, in combination with a concentric conductor the outer or inclosing conductor of which is electrically connected to the archways, substantially as described.

5. A system of electrical distribution consisting of a generator, one or more translating devices, as an electric lamp, a conductor joining the generator and the lamp, and a surrounding conducting-shield extending from the generator to the lamp and constituting a return-circuit, with a switch for making and breaking the connection between the generator and the lamp, said switch having electrical connection with the conducting-shield, substantially as described.

6. In a system of electrical distribution, an insulated removable cable located in a conduit near the surface of the sidewalk, in combination with metallic archways adapted to carry said cable over the street and alley crossings, said archways having electrical connection with the earth and constituting the return-circuit for the current used, substantially as described.

7. The described system of house-conduits and terminal fixtures for electric lighting, consisting of separable longitudinally-divided conducting-tubes joined together around an insulated incoming conductor and to each other, protecting said inclosed conductor, forming a path for the return current, and electrically connected to earth, all substantially as described.

8. In a system of electrical distribution, a conduit inclosing a main conductor, branch conduits located in alternate streets and connected to the main conduit, branch mains inclosed in said branch conduits and connected directly to the main conductor, concentric feeders having their interior concentric conductors connected directly to the branch mains and their exterior conductors connected directly to the earth, with translating devices connected in circuit with the concentric feeders, and a source of electrical energy having one pole connected directly to the main and its other pole to earth, all of said conduits being located substantially above ground, substantially as described.

9. The described system of house-conduits and terminal fixtures for electric lighting, consisting of concentric conductors, including one or more translating devices in circuit with said concentric conductors, and a switch for each translating device, said switch being connected electrically with the exterior concentric conductor, the latter being in electrical contact with the earth, whereby dangerous shocks are avoided in connecting and disconnecting the translating devices, substantially as described.

10. In a system of electrical distribution, a conduit located substantially above ground, an electrical main or conductor inclosed in said conduit, and switch-boxes communicating with the conduit, located also above ground and including switch connections, in combination with concentric conductors running from the switch-boxes to the translating devices, the exterior concentric conductors being electrically connected to earth, the main or conductor being connected to one pole of a source of electrical energy, having its other pole electrically connected to earth, substantially as described.

11. In a system of electrical distribution, a conduit located above ground, having removable covers and inclosing an electrical main or conductor, and switch-boxes also located above ground, having communication with the conduit and provided with switch connections, in combination with concentric conductors running from the switch-boxes to the translating devices, the exterior concentric conductor being electrically connected to earth and the main being connected to one pole of a dynamo, having its other pole electrically connected to earth, substantially as described.

12. In a system of electrical distribution, the combination of the following elements: a source of electrical energy, having one pole electrically connected to earth and its other pole electrically connected to a conductor located in a conduit situated above the surface of the earth, said conduit being provided with removable covers, switch-boxes located at intervals above the surface of the earth and having communication with the conduit, and concentric conductors running from the switch-boxes to the translating devices, the exterior concentric conductors being connected with the earth and separable, whereby the entire system of interior conductors may be easily removed and repaired, substantially as described.

13. In a system of electrical distribution, a main conduit inclosing one or more conductors, in combination with two-way archways located at alternate streets and single-way archways located at intervening streets and branch conductors located in conduits running around the blocks in sets of four from the two-way archways, substantially as described.

14. In a system of electrical distribution, one or more conducting-tubes inclosing each one or more electrical conductors having electrical translating devices in circuit therewith, in combination with switches or keys for the translating devices, the conducting portions of said switches being connected electrically with the earth through the surrounding pipes or tubes, substantially as described.

15. A system of interior or house wiring, consisting of a series of conducting conduit-tubes extending throughout a building and having electrical connection with the earth, in combination with removably-inclosed insulated conductors including translating devices in circuit and a switch for each translating device, the conducting portion of which is connected electrically with the system of tubing, substantially as described.

16. In a system of electrical distribution, a dynamo-electric machine having one pole connected with the earth and the other with a removably-insulated conducting-main located in a conduit near the earth's surface, in combination with concentric branch mains running into buildings, the inner branch being removable and the outer branch in electrical connection with the earth, substantially as described.

17. A system of electrical conductors for distribution of large-quantity or high-tension currents, consisting of a single electrical main running through the center of the district to be supplied and connected to one pole of a generating-dynamo, branch mains radiating from this main through alternate streets, and concentric conductors surrounding the branch mains and connected electrically to earth, the other pole of the generating-dynamo being connected, also, to earth, substantially as described.

18. A system of electrical conductors for the distribution of large-quantity or high-tension currents, located in conduits near the sidewalk, metallic switch-boxes joined to the conduits at the intersection of the streets or alleyways, having their bases electrically connected with the earth and being provided with switching apparatus located above the surface of the earth and doors for admitting of access to the switching apparatus, substantially as described.

19. A system of electrical conductors for use in the transmission of large-quantity or high-tension currents, consisting of a series of concentric conductors having lateral branches also concentric, the inner conductors of the entire series being removable from the outer conductors and the latter electrically connected with the earth, substantially as described.

20. A main or feeder connected with one pole of a generating-dynamo and located in an insulating-conduit running through the district to be supplied, and branch feeders radiating therefrom through alternate streets and surrounded by concentric return-conductors electrically connected with the earth, the inner conductors or branch feeders being removable and the other pole of the dynamo connected electrically to earth, substantially as described.

CHARLES J. KINTNER.

Witnesses:
   N. S. BAILEY,
   A. V. HINEY.